United States Patent [19]
Dils, Jr. et al.

[11] 3,786,784
[45] Jan. 22, 1974

[54] FISH FEEDING APPARATUS

[75] Inventors: Eugene W. Dils, Jr.; Larry A. Ward; Robert A. Ward, all of Vancouver, Wash.

[73] Assignee: Garon Company, Vancouver, Wash.

[22] Filed: July 3, 1972

[21] Appl. No.: 268,463

[52] U.S. Cl. .............................. 119/51 R, 193/14
[51] Int. Cl. ........................................ A01k 5/00
[58] Field of Search 119/51 R, 51 CF, 3, 5; 193/14; 239/553.5

[56] References Cited
UNITED STATES PATENTS
3,526,210  9/1970  Burton .............................. 119/51 R
3,477,407  11/1969  Loudon ............................ 119/51 R
1,123,246  1/1915  Clark .................................. 193/14
1,197,839  9/1916  McAulis ............................... 193/14

*Primary Examiner*—Louis G. Mancene
*Assistant Examiner*—J. N. Eskovitz
*Attorney, Agent, or Firm*—Kolisch, Hartwell & Dickinson

[57] ABSTRACT

A conduit system in fish feeding apparatus including plural end-to-end disposed conduit sections which, when in communication with one another, define an elongated flow path for feed. Each conduit section is pivoted adjacent its intake end to permit selective downward swinging of its discharge end to dispense feed out of the flow path. Adjacent the discharge end of each such conduit section, and positioned beneath the flow path, is a multi-vaned diffuser which, with the discharge end of the associated conduit section lowered, diffuses feed dispensed from such end.

8 Claims, 4 Drawing Figures

PATENTED JAN 22 1974 3,786,784
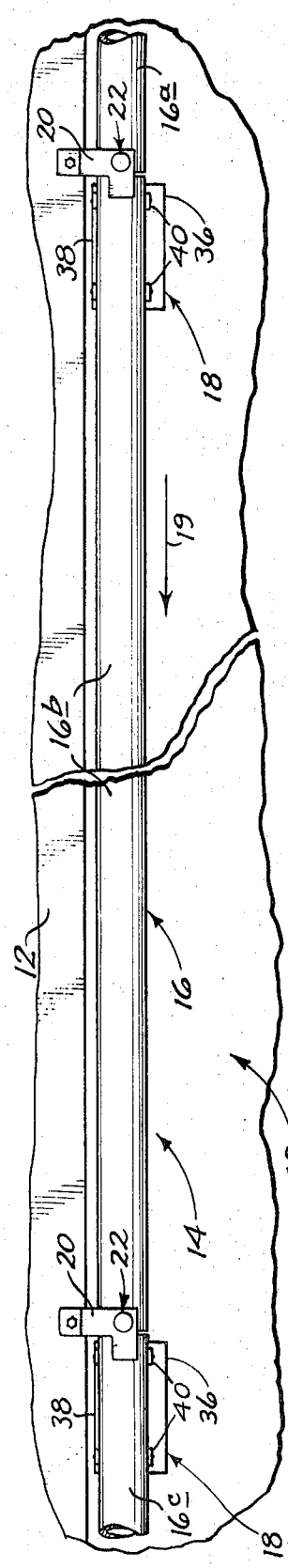
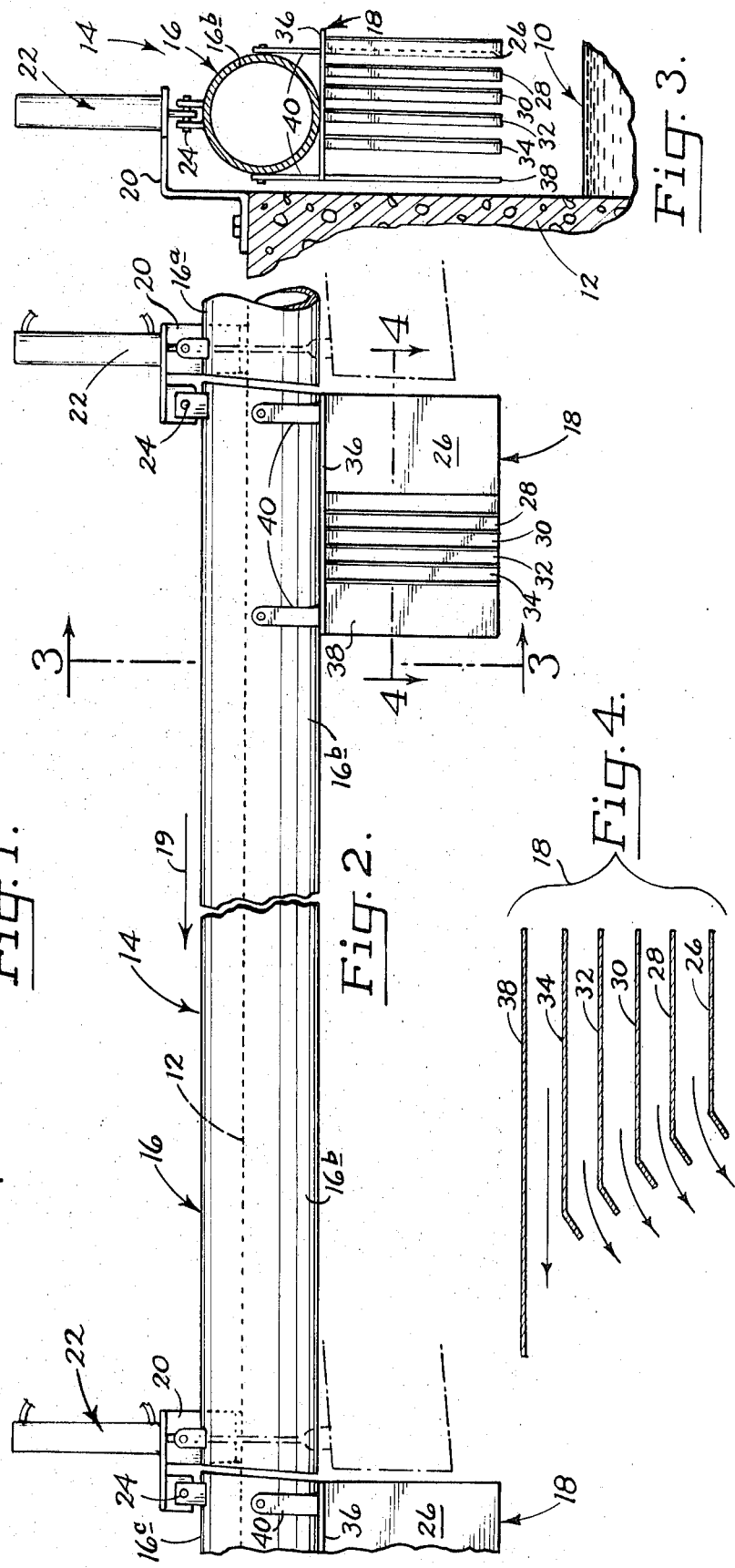

3,786,784

FISH FEEDING APPARATUS

BACKGROUND AND SUMMARY OF THE INVENTION

This invention pertains generally to fish feeding apparatus. More particularly, it pertains to a conduit system in such apparatus including plural sections, each of which may be moved out of registry with other sections to permit the dispensing of feed at different selected points along the system. Means is also provided in the system, out of the flow path defined when the conduit sections are in registry with one another, for diffusing feed dispensed at each of the just-mentioned selected points.

In caring for fish in fish hatcheries and the like, it has been found that the manner in which fish are fed plays an important roll in obtaining optimum growth and maturing of the fish. It is important, for instance, that feeding take place on a regular basis, and that when feeding does take place, the food be as evenly distributed as possible over the pool of water where the fish are located. This situation best enables all fish in the pool to have an opportunity to obtain their share of feed. Because of these and other considerations, including the desirability of reducing labor costs, there has been an increasing reliance in recent years on mechanical-type feeders for performing the feeding function.

The usual fish feed is a pelletized material, oftentimes consisting of moist pellets in a frozen condition. It is important that these pellets be distributed without being broken up, since it is only with the eating of a whole pellet that a fish is assured of obtaining a balanced diet. As a consequence, any equipment designed for fish feeding must be of a construction which is capable of handling such pellets without introducing a high breakage factor. Another important factor is that the feed be handled in such a manner as to enable the easy dispensing thereof, relatively uniformly, over large areas in a pool. Thus, it is important that the feed be handled so as to minimize the likelihood of its becoming clumped in the process of being conveyed for dispersal in a pool. Also, it is important that the feed be handled so as to minimize the likelihood of its sticking to and accumulating in the means used to convey it to a pool. Yet another factor to be considered is that the means for conveying feed should be capable of delivering it at selected different areas of a pool, to enable controlled delivery during a feed cycle.

Generally, an object of this invention is to provide new and improved fish feeding apparatus which takes the above-indicated factors into account in a very practical and satisfactory manner.

More specifically, an object of the invention is to provide a novel conduit system in fish feeding apparatus which readily enables the diffused dispensing of fish feed over different wide selected areas in a pool.

Accordingly, the present invention features a feed-carrying conduit system in which plural conduit sections are disposed end-to-end along a side of a fish pool. The intake ends of these conduit sections are pivoted to allow selective downward swinging of the discharge ends of the sections, one at a time, to allow the dispensing of feed at different selected points along a pool. With the various conduit sections in the system in registry with one another, the same define an elongated flow path for feed which is unobstructed. To accomplish wide diffusing of feed at the point where a discharge end of a conduit section is lowered, the system employs novel multi-vaned diffusers which are mounted adjacent such ends and beneath the next-adjacent downstream conduit section. These diffusers, being out of the flow path just described for feed, introduce no obstructions in the conduit sections which might tend to promote clumping and/or accummulation of feed in the sections.

DESCRIPTION OF THE DRAWINGS

Various other objects and advantages attained by the invention will become more fully apparent as the following description is read in conjunction with the accompanying drawings, wherein:

FIG. 1 is a fragmentary top plan view illustrating feeding apparatus as contemplated by the invention;

FIG. 2 is a fragmentary side elevation, on a somewhat larger scale than FIG. 1, further illustrating the system of FIG. 1;

FIG. 3 is a view taken generally along the line 3—3 in FIG. 2; and

FIG. 4 is an enlarged view taken generally along the line 4—4 in FIG. 2.

DETAILED DESCRIPTION OF THE INVENTION

Turning now to the drawings, and referring particularly to FIGS. 1–3, indicated generally at 10 is a portion of an elongated pool for raising fish—one elongated side of this pool being defined by a wall 12. Mounted on and extending along wall 12 is fish feeding apparatus 14, including an elongated conduit system, or conduit means, 16, and a plurality of diffusers 18, constructed in accordance with the present invention. Conduit system 16 comprises a plurality of generally end-to-end disposed, elongated, tubular conduit sections, such as the three conduit sections shown at 16a, 16b, 16c in FIGS. 1 and 2. Conduit section 16a is toward the upstream end of the system, and conduit section 16c toward the downstream end of the system. As a consequence, the right ends of the conduit sections in FIGS. 1 and 2 are referred to as the intake ends thereof, and the left ends are referred to as the discharge ends.

The upstream end of conduit system 16 connects with suitable apparatus for producing a flow of feed entrained in an air stream in the direction of arrow 19 in FIGS. 1 and 2. This apparatus forms no part of the present invention, and thus is not shown or described herein. However, it may be noted that apparatus suitable for this purpose is described in our copending application, Ser. No. 207,470, filed Dec. 13, 1971 for "Feeding Apparatus."

Considering how the various conduit sections in apparatus 14 are mounted on wall 12, suitably attached to the wall, at points spaced therealong and adjacent the confronting ends of the conduit sections, are a plurality of similar bracket structures 20. Each bracket structure is immediately adjacent the discharge end of one conduit section, and the intake end of the next-adjacent downstream conduit section--supporting the former through a generally upright double-acting pneumatic ram, such as rams 22, and supporting the latter through a pivot connection, such as pivot connections 24. As can be seen clearly in FIGS. 1 and 3, the conduit sections are disposed laterally of wall 12, and over the water in pool 10. Pivot connections 24 accommodate vertical swinging of the associated conduit sections with extension and contraction of the respective associated rams. The confronting ends of each adjacent pair of conduit sections are cut off at the angles indicated in FIG. 2 to permit such swinging. The opposite ends of the cylinders in rams 22 are connected through suitable hoses to a conventional pneumatic system enabling independent selective actuation of the different rams.

With rams 22 contracted, the various conduit sections are in raised positions, in registry with one another, and with slight gaps between their confronting ends. A raised position for a conduit section constitutes a nonfeed-dispensing position for the section herein. A lowered position for a conduit section is referred to as a feed-dispensing position. In FIG. 1, and in FIG. 2 in solid outline, the conduit sections illustrated therein are shown in raised positions. In dashed lines in FIG. 2, conduit sections 16a, 16b are shown lowered. The line along which the longitudinal axes of the various conduit sections lie, with the latter in registry, is referred to herein as a flow path for feed in the apparatus.

The diffusers, or diffuser means, 18 are substantially the same in construction. Referring to all of the figures, each diffuser comprises a plurality of generally upright, spaced-apart, angular, different length vanes, such as vanes 26, 28, 30, 32, 34, suitably joined to the underside of a generally horizontal over-head shield plate 36. The far edge of a plate 36 in the figures joins with a generally upright back plate 38. It will be noted that plate 36 in a diffuser covers portions of the tops of the vanes. Each diffuser is mounted, as by brackets 40 attached to the plate, to the underside of an intake end of a conduit section. It will be noted that these diffusers (which are located adjacent the adjacent set of ends of the conduit sections) are out of the flow path for feed earlier described.

It will be understood that conduit system 16 may have any desired length, and may contain any number of desired conduit sections. The farthest downstream section in the system (not specifically illustrated herein) need not be a pivoted section, and in the case of system 16, is not a pivoted section. Such being the case, the discharge end of this farthest downstream section communicates at all times with a diffuser similar in construction to diffusers 18.

In a typical feed cycle, the apparatus mentioned earlier for producing a flow of feed is started up, with feed pellets then flowing from the apparatus, in the direction of arrow 19, along the feed path defined in the conduit system. Assuming that feeding is to begin adjacent the upstream end of the system, the first upstream pivoted conduit section is lowered through extension of its associated ram, with feed then flowing into the associated diffuser, and being spread thereby over a relatively wide area in pool 10. The arrows in FIG. 4 indicate how feed is diffused. After a selected period of time, and when feeding is to take place adjacent the next downstream diffuser, the first-lowered conduit section is raised, and the next downstream conduit section is lowered to produce the same feed-spreading action adjacent the next downstream diffuser. Such operation continues, with feeding progressing at the desired rate down along the pool.

It will be noted that between the ends of the conduit system, with the various conduit sections raised, there is no obstruction therein which might tend to promote clumping and/or accumulation of feed in the system.

The diffusers, being below the flow path for feed, thus are engaged by feed only at the specific respective times when they are called upon to diffuse feed.

With the diffusers constructed as shown, here also clumping and accumulation of feed is minimized. With the vanes in the diffusers disposed upright, and being relatively widely spaced as shown, such problems are avoided. Since the diffused plates are open at the bottom, some of the material may fall down from between the plates before traveling to the ends of the plates. This produces greater diffusion of material, as well as a cleaning action.

Thus the proposed apparatus effectively takes into consideration the various factors mentioned earlier. Also, it will be noted that the proposed apparatus is relatively simple in construction, and is of a type that can easily be incorporated in pools of various shapes and sizes.

While a preferred embodiment of the invention has been described herein, it is appreciated that variations and modifications may be made without departing from the spirit of the invention.

It is claimed and desired to secure by letters patent:

1. In fish feeding apparatus for dispensing feed entrained in an air stream,
   an upstream conduit section,
   feed supply means registering with the intake end of said upstream conduit section for blowing air-entrained feed into said intake end,
   a downstream conduit section following the upstream conduit section having an intake end proximate the discharge end of said upstream conduit section,
   means for laterally displacing the discharge end of said upstream conduit section between a first position which registers with the intake end of said downstream conduit section and a second position which is located to one side of said intake end of the downstream conduit section, the intake end of the upstream conduit section being maintained in registry with said feed supply means during such lateral displacement of the discharge end thereof, and
   diffuser means disposed in front of the discharge end of the upstream conduit section with such displaced to its said second position.

2. The fish feeding apparatus of claim 1, wherein the upstream conduit section, with such occupying its said first position, and said downstream conduit section form an elongate substantially horizontal expanse of conduit, and the discharge end of the upstream conduit section is laterally displaced downwardly to place it in its said second position.

3. The fish feeding apparatus of claim 1, wherein said upstream conduit section comprises an elongate tube, and the means for laterally displacing the discharge end of the upstream conduit section comprises a pivot mounting for said tube adjacent the intake end thereof accommodating lateral swinging of the discharge end of the tube with no substantial lateral displacement of the intake end of the tube.

4. The fish feeding apparatus of claim 3, wherein said diffuser means comprises multiple, substantially upright, spaced apart vanes with edges of said vanes positioned in front of the discharge end of said tube with said tube in its said second position.

5. In fish feeding apparatus for dispensing air-entrained feed, a conduit system comprising plural conduit sections positioned end to end, each having an intake end and a discharge end and the discharge end of a conduit section which is followed by another conduit section downstream therefrom registering with the intake end of said other conduit section, feed supply means for blowing air-entrained feed into the intake end of the conduit section at the upstream end of the conduit system, each conduit section being pivotally mounted adjacent its intake end to accommodate lateral swinging of the conduit section and being laterally displaceable at the discharge end of the section without substantial lateral movement of the intake end of the section, and diffuser means for each conduit section which is positioned in front of the discharge end of the conduit section with such swung laterally to displace the discharge end thereof.

6. The apparatus of claim 5, wherein a diffuser means for one conduit section comprises a vane assembly supported on the intake end of the conduit section downstream from said one conduit section.

7. The apparatus of claim 5, wherein each diffuser means comprises a plurality of generally upright spaced-apart vanes.

8. The apparatus of claim 7, wherein each diffuser means further comprises an overhead shield covering the tops of said vanes.

* * * * *